Sept. 17, 1963      R. E. FISCHELL      3,104,080
ENERGY ABSORPTION MECHANISM
Filed Jan. 31, 1963

ROBERT E. FISCHELL
INVENTOR

BY Claude Funkhouser
ATTORNEY

3,104,080
ENERGY ABSORPTION MECHANISM
Robert E. Fischell, Silver Spring, Md., assignor to the United States of America as represented by the Secretary of the Navy
Filed Jan. 31, 1963, Ser. No. 255,416
15 Claims. (Cl. 244—1)

This invention relates in general to energy absorption mechanisms and, more particularly, to an improved energy absorption mechanism for absorbing libration energy of a gravity oriented satellite.

Gravity orientation requires that the axial moment of inertia be less than the transverse moment, as fully described by R. E. Fischell in his article entitled "The TRAAC Satellite," published in the January-February 1962 issue of the APL Technical Digest, published by the Applied Physics Laboratory of The Johns Hopkins University. This article describes the forces acting upon a satellite and why a dumbbell-shaped satellite may become gravity oriented.

Additionally, G. M. Schindler in his article entitled "On Satellite Librations," published in the May 1959 issue of the American Rocket Society Journal, describes the forces acting on a dumbbell-shaped satellite making it oscillate about an attitude of equilibrium somewhat like a pendulum. The instant invention is a mechanism used to absorb and to dissipate the energy of the oscillations, thereby stopping said oscillations.

One object of the present invention, therefore, resides in the provision of an energy absorption mechanism for use with a gravity stabilized satellite for stopping oscillations about the gravity stabilized axis.

Another object of the invention is to provide an energy absorption mechanism including a lossy spring which will operate reliably in a space environment.

A further object of the invention is to provide an energy absorption mechanism including means for deploying the lossy spring.

Figure 1:
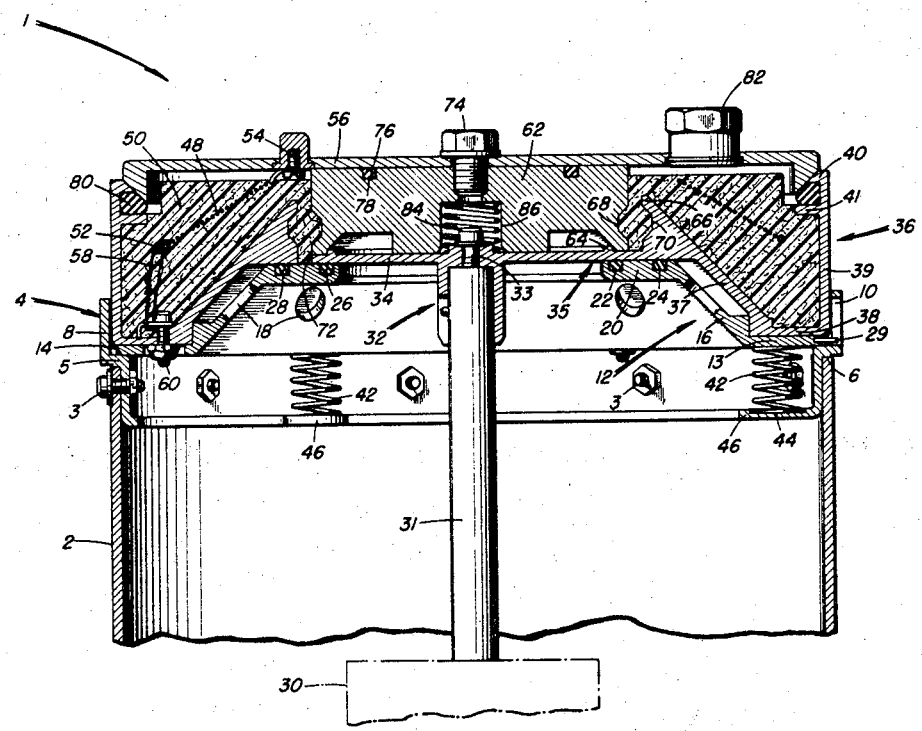
Figure 2:
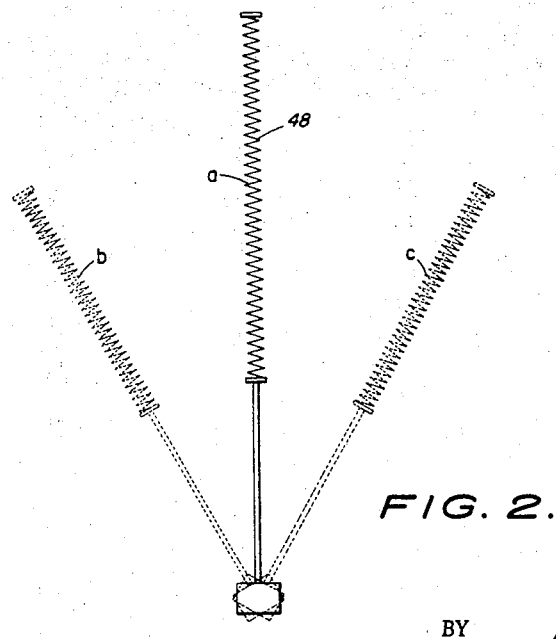

Other objects and many of the attendant advantages of this invention will be readily appreciated as the same becomes better understood by reference to the following detailed description when considered in connection with the accompanying drawings, wherein:

FIG. 1 is a sectional view of the energy absorption mechanism in its initial position; and FIG. 2 is a schematic representation of the angular librations of a gravity stabilized satellite, showing the contraction of the lossy spring whereby the energy of the librations is absorbed.

The energy absorption mechanism, indicated at 1 in FIG. 1, is shown attached to a boom housing 2 by suitable connecting means 3. A cup shaped adapter 4, having an integral shoulder 5, is partially received within said housing whereby the underface 6 of said shoulder 5 rests upon said housing 2, thereby prohibiting further inward movement of said adapter. Said adapter 4 has an integral guide wall, indicated at 8, in which there is located a plurality of vertical slots 10. An annular sealing plate 12 is received within said adapter 4 and has an annular lower outer member 13, which rests upon the upper face 14 of said shoulder 5, and an integral, frustro-conically shaped venting member 16, having a plurality of vents 18 located therein for venting atmospheric pressure as the satellite is launched. Said plate 12 additionally has an integral radial sealing seat 20, in which a pair of annular grooves 22 and 24 are located, holding respectively a pair of O-rings 26 and 28. Said bottom member 13 has a plurality of guide pins 29 located therein at its outer periphery and extending partially through said slots 10.

An extendible boom assembly 30 is mounted within the housing 2, said boom being manufactured by the De Havilland Aircraft of Canada, Ltd., Model No. A–16. The boom itself, indicated at 31, is shown partially extended and attached to a spring mounting assembly 32 by suitable fastening means 33. An axial plate 34 constitutes a portion of a bottom wall 35 of an open ended spring mounting receptacle 36, said wall 35 comprising additionally an integral frustro-conical portion 37, which surrounds the venting member 16 in spaced relation thereto, and an outer portion 38 that engages member 13. Said receptacle 36 includes additionally an integral side wall 39 that has a pair of inwardly directed annular flanges 40 and 41 on its upper end portion.

The boom 31 is initially adjusted to hold the assembly 32 under tension, thereby compressing the O-ring seals 26 and 28. A plurality of springs 42 have their lower ends resting in recesses 44 within an integral lower member 46 of the adapter 4, maintaining the O-rings 26 and 28 compressed against the assembly 32 but primarily required in overcoming the inertia of the assembly 32 when a motor within the boom assembly 30 is activated.

A spring 48, having a plurality of coils, is cast in a block of biphenyl 50, secured within said receptacle 36 by the flange 41. One end of the spring 48 is connected to a forming wire 52, while the other end is connected by suitable means 54 to a cover 56. The forming wire 52 is attached to the bottom wall 38 of the receptacle 36 by a plurality of nylon loops 58 and attaching means 60. A weight 62 is correctly positioned upon the wall 35 by an annular keying member 64 located on said wall 35. The weight is positioned upon the wall 35 prior to casting the biphenyl, and is secured to said wall by portions of said biphenyl which are disposed between a rim 66, which is formed by extending the walls 35 and 37, and said weight 62 in confronting grooves 68 and 70 on the weight and rim, respectively. Thus, the weight is secured to the wall by the biphenyl in the grooves until said biphenyl sublimes in the space environment through a plurality of ports 72 located in the wall 35, after separation of said assembly 32 from the sealing plate 12, as will be described hereinafter.

The cover 56 is secured to the weight 62 by a bolt 74, thereby deforming an O-ring 76 partially received within an annular groove 78 in the weight 62, and a larger O-ring 80 positioned between the pair of inwardly directed annular flanges 40 and 41 on the upper portion of the side wall 39. The annular flange 40 has its inner edge chamfered to mate with a corresponding surface on the cover 56. The O-ring 76 prevents the biphenyl from subliming into space around the bolt 74, while the O-ring 80 prevents the biphenyl from subliming around the cover 56. Said cover, O-rings and flanges cooperate to close the upper end of said receptacle 36. A pressure valve 82, mounted in the cover 56, releases atmospheric pressure from beneath said cover as the entire energy absorption mechanism 1 is launched into outer space, thus preventing a buildup of pressure which might break the seal between the cover 56 and the flange 40. A compressed spring 84 rests upon the wall 35 and engages the weight 62 in a recess 86 located within said weight, for ejecting the weight after it is no longer held by the biphenyl material.

In operation, the energy absorption mechanism is mounted on a satellite which is launched into outer space, spinning at a rate of a few revolutions per second. The spinning is stopped by mechanical and magnetic mechanisms described by Robert Fischell in his U.S. patent application entitled "Magnetic Despin Mechanism," Serial No. 83,603, filed January 18, 1961. The satellite becomes magnetically oriented by means of the invention described by Fischell et al. in their U.S. patent application "Magnetic Satellite Control," Serial No. 99,644, filed March 30, 1961. While the satellite is magnetically oriented, it turns a chosen surface away from the earth. It is during this period of the satellite's orbit that the boom is extended and the satellite becomes gravity oriented, as described by Robert Newton in his U.S. patent application entitled "System for Gravity Orienting a Satellite," Serial No. 249,961, filed January 7, 1963. The magnetic orientation system may then be de-energized. This is accomplished by connecting a large capacitor in parallel with an electromagnet which is used to obtain the magnetic orientation, causing a decaying oscillation of the electromagnet current when power is commanded off. However, some magnetic stabilization force will remain in the form of the despin rods for damping out disturbances to the satellite's orientation, caused, for example, by collisions with micrometeorites.

The greatest problem in gravity gradient stabilization is damping out the oscillation of the satellite about the local vertical axis. The damping of this libration motion can be accomplished by the instant invention.

When extended, the damping spring 48 has the shape of the surface of a frustrum of a cone. In its unextended position, as shown in FIG. 1, the inside diameter of the spring may be 4 inches and its outside diameter may be 7¼ inches, and the spring may consist of 142 turns.

In a gravitational field of one $g$, the spring 48 is incapable of supporting even one of its turns without exceeding the elastic limit of the material. In order to prevent any tangling of the spring or other damage during handling and launching operations, it is necessary to encapsulate it in the solid subliming biphenyl block 50. After the spring is formed, it is placed on a conically shaped holder of machined biphenyl and some additional biphenyl is poured on top of it. The biphenyl 50 is also used to securely hold the weight 62 to the mounting plate during the erection of the boom. After the boom is extended the biphenyl sublimes, thereby first releasing the weight 62 under spring force, which is eventually pulled completely off to the extent the spring allows due to gravity gradient force, and then by gradually subliming around the conically formed spring, the biphenyl allows the spring to extend one coil at a time under the gravity gradient force exerted on the weight which is pulling the spring out from its receptacle.

FIG. 2 is a schematic representation showing the method by which the spring absorbs libration energy and damps out the libration about the gravity stabilized axis. In position $a$, the spring 48 is fully extended under the existing conditions, but as it swings to position $b$, it contracts, thereby absorbing some energy. As the satellite begins to move to position $c$, it passes again through position $a$, where the spring is again extended under the gravity gradient forces, absorbing an additional amount of energy, and the satellite, continuing on to position $c$, absorbs further libration energy by means of the spring contracting again. By this repetitive process, all the libration energy is absorbed and the satellite gradually becomes oriented, having one side always facing the earth.

Obviously, many modifications and variations of the present invention are possible in the light of the above teachings. It is therefore to be understood that within the scope of the appended claims the invention may be practiced otherwise than as specifically described.

What is claimed is:

1. In combination with a satellite,
an energy absorption mechanism including a block of sublimable material,
a spring initially embedded in the block, and
means for extending the spring as the sublimable material sublimates.

2. An energy absorption mechanism comprising,
a spring mounting receptacle,
a weight positioned within said receptacle,
a block of subliming material filling said receptacle and surrounding said weight, and
a spring encapsulated within said subliming material and connected to said receptacle and to said weight,
said spring and weight being released from said receptacle upon sublimation of said block of subliming material.

3. An energy absorption mechanism comprising,
a spring mounting receptacle,
a weight positioned within said receptacle,
a block of subliming material secured within said receptacle and surrounding said weight,
said weight having means receiving a portion of said subliming material for securing said weight to said block, and
a spring encapsulated within said block of subliming material and connected to said weight and said receptacle,
said weight and said spring being released from said receptacle upon sublimation of said block of subliming material.

4. In combination with an orbiting satellite having a boom assembly provided with an adapter, an energy absorption mechanism comprising,
a spring mounting receptacle displaceably mounted in the adapter and including a bottom wall formed with ports,
a weight disposed within the receptacle,
a rim mounted on said bottom wall,
said rim and said weight having confronting grooves,
a block of subliming material in said receptacle and filling the confronting grooves and the space therebetween, and
a spring embedded in said block and connected to said weight and to said receptacle,
the material of said block subliming through said ports and from said receptacle, whereby the weight will be released from the receptacle and the spring will be caused to pay out from said receptacle by said weight.

5. An energy absorption mechanism including,
a spring mounting receptacle having a bottom wall formed with ports,
a cover for the receptacle,
a weight within the receptacle and secured to the cover,
a block of subliming material within the receptacle and connecting the weight to said receptacle, and
a spring embedded in said block and connected to said cover and to said receptacle,
said weight and said spring being released from said receptacle upon sublimation of said block through said ports.

6. In combination with an orbiting satellite having a boom assembly provided with an adapter, an energy absorption mechanism comprising,
sealing means within the adapter,
a spring mounting receptacle displaceably mounted in the adapter and connected to said boom assembly, said receptacle having a bottom wall engaging the sealing means and formed with ports,
a weight disposed within the receptacle,
closure means for said receptacle attached to said weight,
a block of subliming material secured within said receptacle and surrounding said weight,
said weight having means receiving a portion of said subliming material for securing said weight to said block, and
a spring embedded in said block of subliming material and connected to said weight and said receptacle,
the material of said block subliming through said ports upon displacement of the receptacle from the sealing means, whereby the weight will be released from the receptacle and the spring will be caused to pay out from said receptacle by said weight and closure means.

7. An energy absorption mechanism as recited in claim 6, wherein said sealing means comprises,
   a sealing plate positioned upon said adapter for engaging said receptacle and formed with a pair of grooves for defining an area with which said ports communicate, and
   a pair of deformable sealing rings partially received within said grooves,
   said receptacle being held against said sealing plate by said boom assembly so as to deform said sealing rings, whereby the area defined by said grooves and with which said ports communicate is effectively closed.

8. An energy absorption mechanism as recited in claim 6, wherein said closure means comprises,
   a cover attached to said weight,
   a pair of inwardly directed flanges integral with said receptacle and positioned about the open end thereof, and
   a sealing ring disposed between said flanges.

9. In combination with an orbiting satellite having a boom assembly provided with an adapter, an energy absorption mechanism comprising,
   a spring mounting receptacle displaceably mounted in the adapter and including a bottom wall formed with circumferentially spaced ports,
   a weight within the receptacle axially thereof and having its circumferential edge located adjacent the ports,
   an annular rim mounted on said bottom wall and encircling said ports,
   said rim and said weight having confronting grooves,
   a block of subliming material in the receptacle and filling the confronting grooves and the space therebetween, and
   a spring embedded in said block and connected to said weight and to said receptacle,
   the material of said block subliming through said ports and from said receptacle upon displacement of the receptacle from the adapter, whereby the weight will be released from the receptacle and the spring will be caused to pay out from said receptacle by said weight.

10. In combination with an orbiting satellite having a boom assembly provided with an adapter, an energy absorption mechanism comprising,
    sealing means within the adapter,
    a spring mounting receptacle displaceably mounted in the adapter and including,
    a bottom wall engaging the sealing means and having an axial plate,
    said axial plate having circumferentially spaced ports and said receptacle being connected to said boom assembly,
    a weight within the receptacle axially thereof and having its circumferential edge located adjacent the ports,
    closure means for said receptacle attached to said weight,
    an annular rim mounted on said bottom wall and encircling said ports,
    said rim and said weight having confronting grooves,
    a block of subliming material in the receptacle and filling the confronting grooves and the space therebetween, and
    a spring embedded in said block and connected to said weight and to said receptacle,
    the material of said block subliming through said ports upon displacement of the receptacle from the sealing means, whereby the weight will be released from the receptacle and the spring will be caused to pay out from said receptacle by said weight and closure means.

11. An energy absorption mechanism as recited in claim 10, wherein said sealing means comprises,
    a sealing plate positioned upon said adapter and engaging said receptacle and formed with a pair of grooves for defining an area with which said ports communicate, and
    a pair of deformable sealing rings partially received within said grooves,
    said receptacle being held against said sealing plate so as to deform said sealing rings, whereby the area defined by said grooves and with which said ports communicate is effectively sealed.

12. An energy absorption mechanism as recited in claim 10, wherein said closure means comprises,
    a cover attached to said weight,
    a pair of inwardly directed flanges integral with said receptacle and positioned about the open end thereof, the flange nearest said open end being formed to mate with said cover, and
    a sealing ring disposed between said flanges, whereby said ring upon deformation by said cover will provide a leakproof seal for the receptacle.

13. In combination with an orbiting satellite having a boom assembly provided with an adapter, an energy absorption mechanism comprising,
    a sealing plate within the adapter,
    a spring mounting receptacle displaceably mounted in the adapter and a bottom wall engaging the sealing plate and having an axial plate and a frusto-conical portion,
    said axial plate having circumferentially spaced ports and said frusto-conical portion defining a rim,
    a weight within the receptacle axially thereof and having its circumferential edge located adjacent the ports,
    said rim and said weight having confronting grooves,
    a block of subliming material in the receptacle and filling the confronting grooves and the space therebetween, and
    a spring embedded in said block and connected to said weight and to said receptacle,
    the material of said block subliming through said ports upon displacement of the receptacle from the sealing plate, whereby the weight will be released from the receptacle and the spring will pay out from said receptacle.

14. An energy absorption mechanism as recited in claim 13, including additionally,
    a cover for the receptacle, and
    means for urging the cover and weight away from the receptacle and block of subliming material upon sublimation of that portion of said material disposed in said grooves and therebetween.

15. An energy absorption mechanism as recited in claim 14, wherein said means comprises a spring confined between said weight and said receptacle.

References Cited in the file of this patent
UNITED STATES PATENTS
3,031,154    Roberson _____ Apr. 24, 1962